US009792646B2

(12) United States Patent
Ananta et al.

(10) Patent No.: US 9,792,646 B2
(45) Date of Patent: Oct. 17, 2017

(54) METHODS AND SYSTEMS FOR REAL-TIME BIDDING

(75) Inventors: Hemadri Ananta, Cupertino, CA (US); Arun Srinivasan, Cupertino, CA (US); Nithin Mallya, Dublin, CA (US); Yuri Finkelstein, San Carlos, CA (US)

(73) Assignee: eBay Inc., San Jose, CA (US)

( * ) Notice: Subject to any disclaimer, the term of this patent is extended or adjusted under 35 U.S.C. 154(b) by 966 days.

(21) Appl. No.: 12/944,426

(22) Filed: Nov. 11, 2010

(65) Prior Publication Data

US 2012/0123892 A1 May 17, 2012

(51) Int. Cl.
*G06Q 40/00* (2012.01)
*G06Q 30/08* (2012.01)

(52) U.S. Cl.
CPC .................................... *G06Q 30/08* (2013.01)

(58) Field of Classification Search
None
See application file for complete search history.

(56) References Cited

U.S. PATENT DOCUMENTS

2011/0231242 A1* 9/2011 Dilling et al. ............. 705/14.42

* cited by examiner

*Primary Examiner* — Shay S Glass
*Assistant Examiner* — Russell S Glass
(74) *Attorney, Agent, or Firm* — Schwegman Lundberg & Woessner, P.A.

(57) ABSTRACT

A method and a system to provide real-time bidding in online auction. For example, a system may comprise a notification module to generate and transmit a notification to a client machine. The notification may be generated based on a defined end time of a selected auction. A subscription module may establish electronic communication with the client machine responsive to a subscription message received from the client machine in response to the notification. In some instances, the electronic communication is established using a push technology. An event filter may filter an event from a plurality of events related to the selected auction where the filtered event is a highest received bid in the selected auction. The filtered event may then be pushed to the client machine by the subscription module.

20 Claims, 7 Drawing Sheets

*Figure 4*
400
404
4:02 PM
402
AUCTION NOTIFICATION
Auction for "Longaberger Spring Basket" ends in 10 minutes.
ENTER BIDDING
406

*Figure 6*
600
602
AUCTION: Longaberger Spring Basket
604
Time Left: 9m 36s
606
Current Bid: U.S. $36.75
Your bid: $
610
(must be at least U.S. $37.25)
608
BID NOW
612

METHODS AND SYSTEMS FOR REAL-TIME BIDDING

TECHNICAL FIELD

The present application relates generally to the technical field of data communications and, in one specific example, to methods and systems for real-time bidding.

BACKGROUND

In online auctions of items for sale, the final minutes of an auction often determine which bidder will ultimately win the auction. New bids may be submitted so rapidly that a bidder may be outbid before he is able to submit a new bid. As such, the bidder has wasted valuable time submitting a bid that was already too low.

BRIEF DESCRIPTION OF THE DRAWINGS

Some embodiments are illustrated by way of example and not limitation in the figures of the accompanying drawings in which.

DETAILED DESCRIPTION

Figure 1:
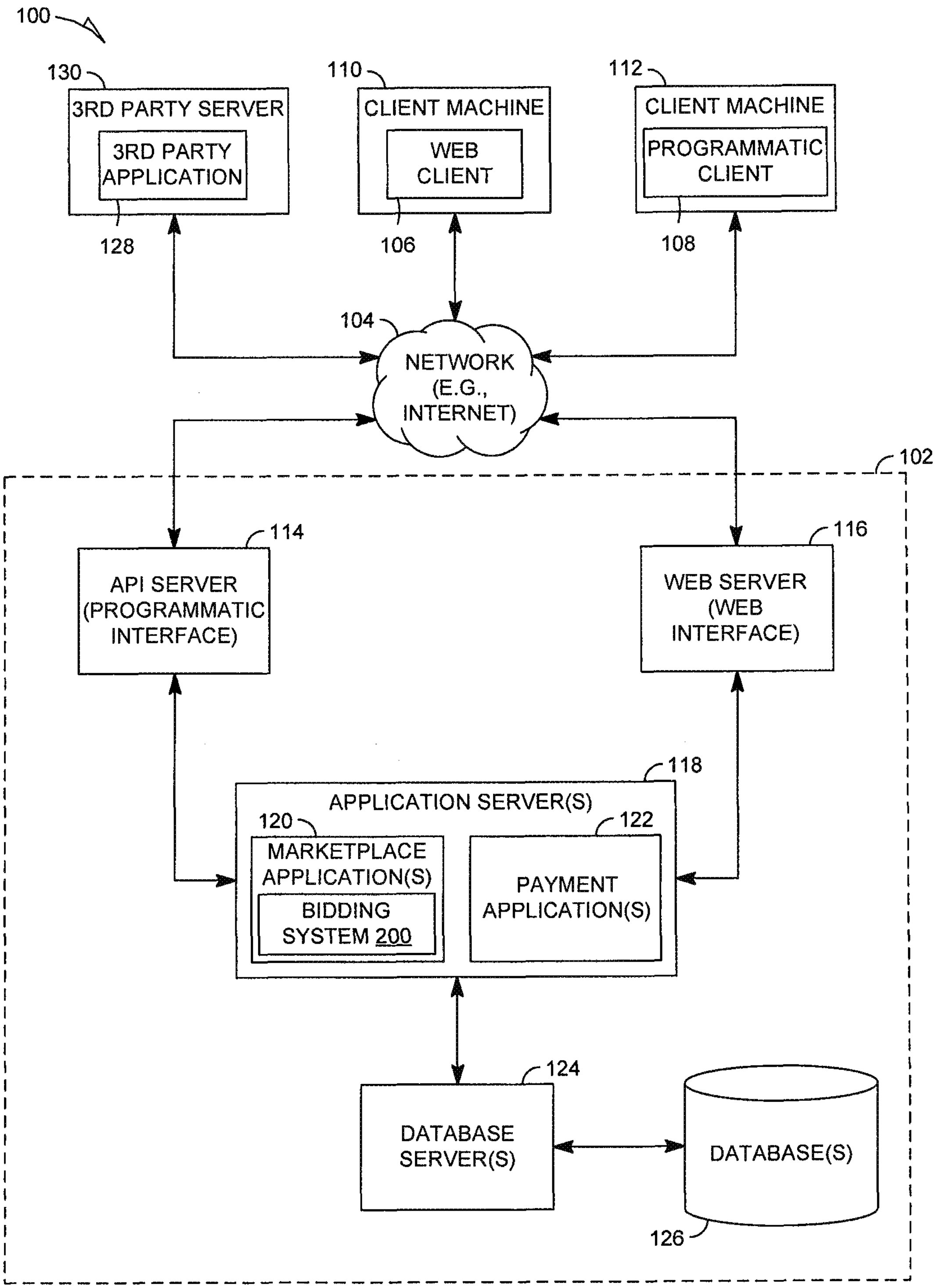
FIG. 1 is a network diagram depicting a client-server system, within which one or more example embodiments may be deployed.

Example methods and systems to provide real-time bidding are described. In the following description, for purposes of explanation, numerous specific details are set forth in order to provide a thorough understanding of example embodiments. It will be evident, however, to one skilled in the art that the inventive subject matter may be practiced without these specific details.

As used herein, an "auction" is an online bidding system, between a seller that has posted one or more items, and a potential buyer wishing to procure at least one of the items, hosted by an electronic marketplace. The auction is based on a listing of the one or more items posted by the seller. The listing contains a description of the one or more items for sale. The auction has a defined end time established when the listing is submitted. One or more users (e.g., the potential buyers) participate in the auction by, for example, watching the auction or bidding in the auction. Also as used herein, the term "or" may be construed in either an inclusive or exclusive sense. Similarly, the term "exemplary" is construed merely to mean an example of something or an exemplar and not necessarily a preferred or ideal means of accomplishing a goal.

In online auctions, often it is the final few minutes of the auction that ultimately determine the winning user in the auction. While some users may access the auction on a client machine that can update (or refresh) quickly and easily, other users may access the auction using a client machine that does not update the bidding data as quickly or only updates upon receiving a refresh command from the user. For example, a handheld mobile device, such as a smartphone, may only update on command in order to conserve bandwidth or power. In operation, the user accessing the auction using the mobile device may not be able to fully participate in the auction if other users using faster client machines or connections are rapidly bidding up the price of the item. This time delay may result in the user of the mobile device being essentially unable to participate in the final minutes of the auction and unable to buy the item. Further, the user of the mobile device is essentially excluded from the bidding, possibly resulting in a lower final price of the auctioned item due to having fewer users able to bid on the item.

To address at least the above issues, systems and methods are provided herein to establish a connection between an auction server and a client machine in the final minutes of an auction to allow the user to receive the most recent bids and to submit bids in real-time. As used herein, "real-time" is defined as substantially real-time where communication may not be strictly instantaneous due to time delays inherent in electronic communications. In some embodiments, a server may transmit a notification to a client machine that the auction is about to end. In one example embodiment, the notification is sent ten minutes before the auction officially ends. The user, using the client machine, is able to subscribe to the auction. In response to the subscription, the server registers the client machine and establishes a connection. The connection is implemented using a push technology, such as WebSockets. While the connection is open, the server manages bids received from other users and pushes the most recent bids to the client machine. The user, using the client machine, may submit a bid or a subsequent bid for the item to the server.

The server may send the notification to the client machine, where it is briefly displayed then stored, so that it can later be accessed by the user of the client machine. The notification may be accessed along with other notifications in a notification mailbox. The notification mailbox is used to retrieve various notifications of events within the online auction environment. The events may include auction endings, new auction announcements, new feedback received, requests for feedback, shipment confirmations, payment confirmations, dispute resolution communications, and the like. The notifications may be managed by the notification mailbox and may expire at a predetermined time or upon an action being performed by the user.

In some instances, the systems and methods for real-time bidding may provide more efficient data communications than is currently available and may reduce network congestion caused by bids that do not exceed a previously submitted bid. Further, bandwidth and power may be preserved by only establishing a push connection when it is desirable to have one.

FIG. 1 is a network diagram depicting a client-server system 100, within which one or more example embodiments may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer® browser developed by Microsoft® Corporation of Redmond, Wash. State), and a programmatic client 108 executing on respective client machines 110 and 112. Client machines 110 and 112 may comprise a personal computer (PC), a tablet PC, a set-top box (STB), a Personal Digital Assistant (PDA), a cellular telephone, a handheld device such as a smartphone, or any machine capable of executing a set of instructions (sequential or otherwise) that specify actions to be taken by that machine.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102, including a bidding system 200, as described in detail, below, in connection with FIG. 2. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace 120 and payment applications 122 are shown in FIG. 1 to both form part of the networked system 102, it will be appreciated that, in alternative embodiments, the payment applications 122 may form part of a payment service that is separate and distinct from the networked system 102.

Further, while the client-server system 100 shown in FIG. 1 employs a client-server architecture, the present invention is of course not limited to such an architecture, and could equally well find application in a distributed, or peer-to-peer, architecture system, for example. The various marketplace 120 and payment applications 122 could also be implemented as standalone software programs, which do not necessarily have networking capabilities.

The web client 106 accesses the various marketplace 120 and payment applications 122 via the web interface supported by the web server 116. Similarly, the programmatic client 108 accesses the various services and functions provided by the marketplace 120 and payment applications 122 via the programmatic interface provided by the API server 114. The programmatic client 108 may, for example, be a seller application (e.g., the TurboLister application developed by eBay® Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
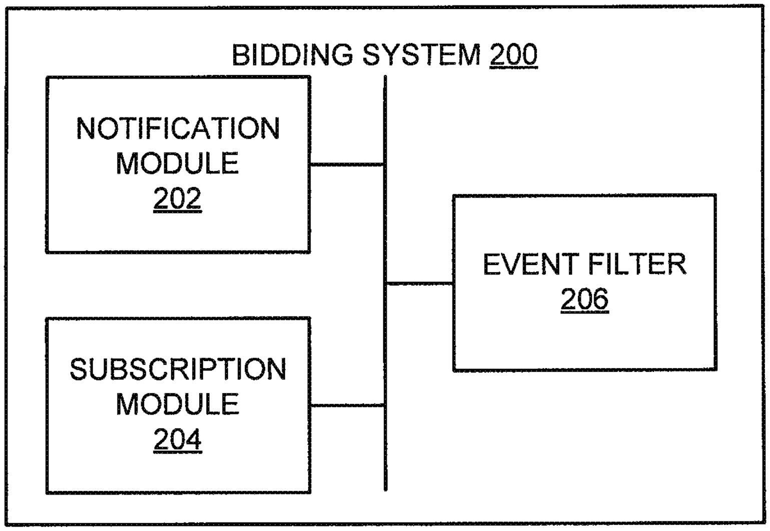
FIG. 2 is a block diagram of an example bidding system, according to some embodiments.

FIG. 2 is a block diagram of an example of the bidding system 200, according to some embodiments. The bidding system 200, along with its various components, may be implemented as hardware or software. The bidding system 200, as shown in FIG. 1, may form part of the marketplace applications 120. However, it is understood that the bidding system 200 may be implemented separate from the marketplace applications 120 or the application servers 118. For example, the bidding system 200 may be implemented as part of the third party application 128 residing on the third party server machine 130. The example of the bidding system 200 comprises a notification module 202, a subscription module 204, and an event filter 206.

The notification module 202 is configured to receive or access a selection of an auction from a user and to send a notification to the user when the end of the auction is imminent. Sometime during an auction, for example, days before the auction ends, the user may select the auction as an auction that the user desires to participate in by, for example, setting a watch on the auction, bidding in the auction, or requesting that an alert be sent before the auction ends.

In some instances, the notification module 202 may manage notifications sent in other contexts. For example, the notifications described herein may be sent based on a stored search, an outstanding action item, or a confirmation related to a listed item. For example, a saved search may be based on one or more keywords in an item title or description, a particular seller, or the like. A notification based on an outstanding action item may include, for example, a reminder to send payment, provide feedback, ship sold item, or the like. A notification based on a confirmation may include, for example, that an item shipped, a payment was received, feedback was received, or the like.

The notification module 202 then generates and transmits a notification to the client machine. For notifications based on an imminent end of a selected auction, the notification may be sent a predefined number of minutes before the end of the auction, for example, ten minutes before the auction ends. The predefined number of minutes may be hardcoded into the notification module 202, set by the bidding system 200, or defined by the user. Notifications based on a saved search may be sent when the listing matching the saved search is posted by a seller. Notifications based on an action item or a confirmation may be sent based on when the triggering events occur. In some instances, the notification module 202 may delay sending notifications according to predefined rules. For example, a user may select to have notifications delivered at specified times or at pre-determined intervals. In some instances, when an auction is about to end and a connection is established, notifications may be temporarily delayed until the auction is completed and the connection is closed (or the delayed notifications may be sent via the connection after the end of the auction but before the connection is closed).

The notifications may include a predetermined expiration, when the notifications are no longer accessible to the user. For example, a notification based on an auction being selected may expire automatically when the auction ends (either at an initially predefined end time or, for example, in a hybrid auction where a seller chooses to "Buy it Now"). A notification based on a saved search may expire when the listing identified by the saved search expires. A notification based on an action item or confirmation may expire when the action item is completed. Other notifications may expire according to a user preference or predefined rules associated with the particular notification.

The subscription module 204 is configured to receive a subscription request from a user in response to a notification, register the client, and establish a connection to the client machine operated by the user. The notification processed by the subscription module 204 is typically a notification that an end of an auction is imminent, however, it is understood that the subscription module 204 may establish a connection based on other types of notification such as those based on action items.

The subscription module 204 receives the subscription to an auction from a client machine, registers the client machine, and establishes the connection to the client machine. The connection includes electronic communication between the client machine and the bidding system 200. The registration and the established connection may be implemented according to one or more types of push technologies. Push technologies are a style of Internet-based or wireless-communication-based communication where the request for a given transaction is initiated by a publisher or central server (e.g., the bidding system 200 residing on the application server 118 or the third party server machine 130). Some examples of push technology include messaging service, Simple Mail Transfer Protocol (SMTP), Apple Push Notification Service, Hypertext Transfer Protocol (HTTP) Streaming, Bidirectional-streams Over Synchronous HTTP (BOSH), JAVA® Pushlet, Long Polling (e.g., Comet programming), Comet, Extensible Messaging and Presence Protocol (XMPP), Push Access Protocol, Push e-mail, Reverse Ajax, streaming media, and WebSockets®.

The subscription module 204 may terminate the connection when the auction ends or at some other suitable time. If a connection is lost before the end of the auction, the subscription module 204 may automatically attempt to re-establish the connection with the client machine.

The event filter 206 is active while a connection is active between the bidding system 200 and the client machine. The event filter 206 manages events received from other clients and determines which events to push to the user via the connection. The filtered events may comprise notifications generated based on bids in the selected auction. In some instances, all bids except the highest submitted bid are filtered from the user. Other notifications, such as those based on saved searches, action items, or confirmations may be at least temporarily delayed by the event filter 206 until the subscribed-to auction is complete. Bids being received in auctions separately from the selected auction may also be filtered using the event filter 206.

Figure 3:
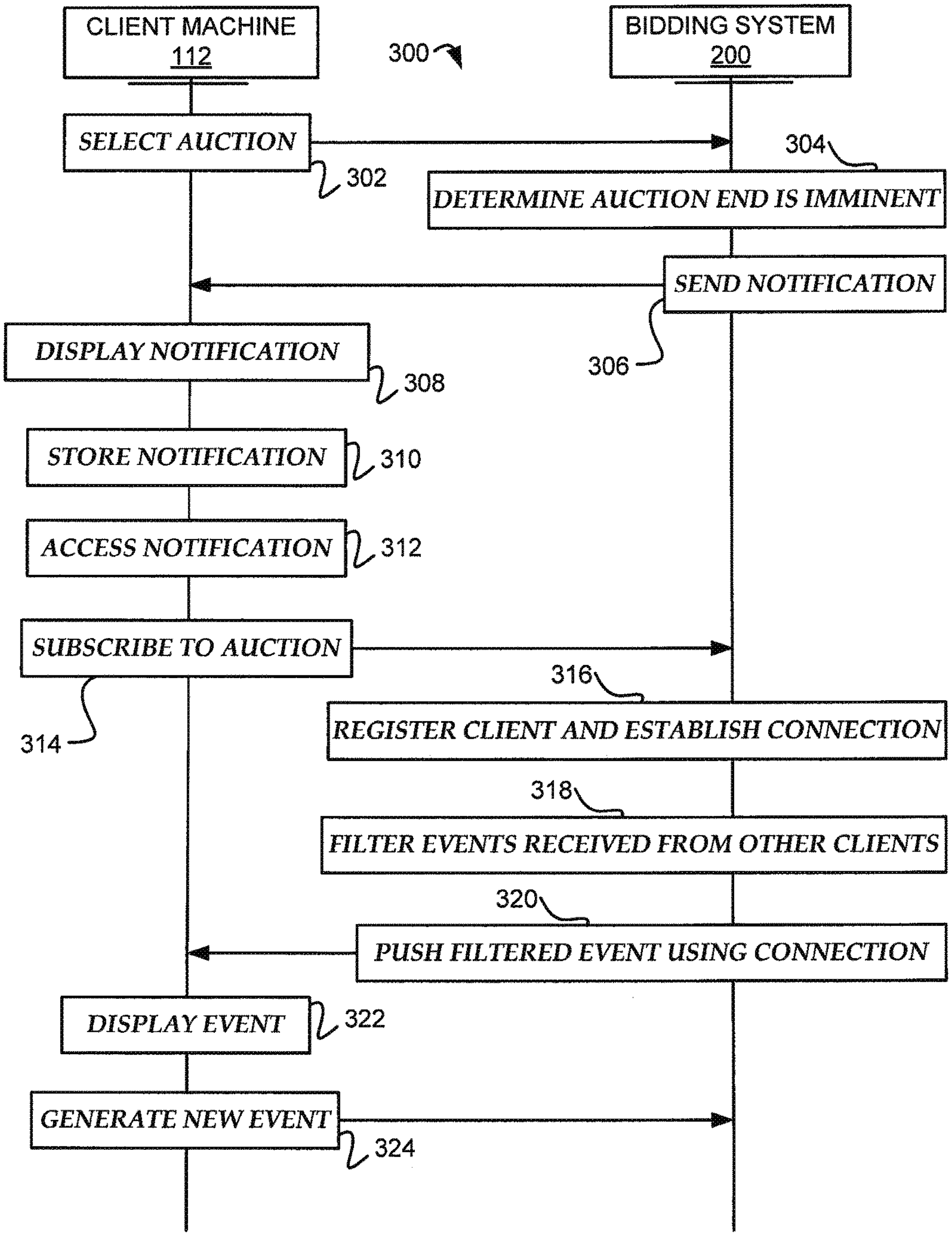
FIG. 3 is a bifurcated flowchart depicting client-side and server-side operations, according to some embodiments.

FIG. 3 is a bifurcated flowchart 300 depicting client-side and server-side operations, according to some embodiments. The bifurcated flowchart 300 shows operations performed at, for example, the client machine 112 (where the user is a bidder) of FIG. 1 and at the bidding system 200 of FIG. 2. The respective operations are shown as being performed by the client machine 112 and the bidding system 200 for the purposes of illustration with the understanding that some operations may be performed by the other side or by additional systems or machines.

In an operation 302, a selection of a particular auction is received from a user of the client machine 112 and is sent on to the bidding system 200. In some instances, the selection managed at the client machine 112 and is sent to the bidding system at a pre-determined time period before the end of the auction. Alternatively or additionally, the selection of the auction triggers a request (e.g., via an API call) for additional information about the auction, including the auction end time.

In an operation 304, sometime later, or nearly immediately if the selection is received when the end of the auction is imminent, a determination is made whether the end of the auction is imminent. In some embodiments where the client machine 112 receives the auction end time in response to the selection of the auction, the operation 304 may be performed by the client machine 112.

In an operation 306, a notification is pushed from the bidding system 200 to the client machine 112 that indicates that the auction is about to end. Operation 306 may be optional in embodiments where the client machine 112 performs operation 304.

Figure 4:
FIG. 4 is an illustration depicting at least a portion of a first user interface, according to some embodiments.

In an operation 308, the notification is displayed to the user at the client machine 112. An example notification is depicted in FIG. 4, discussed below. The notification may be displayed for a brief period of time, e.g., 1, 3, 5, 10, or 30 seconds or, alternatively, may be displayed persistently until the end of the auction or until the user closes the notification. Operation 308 may be optional in embodiments where the client machine 112 performs operation 304.

Figure 5:
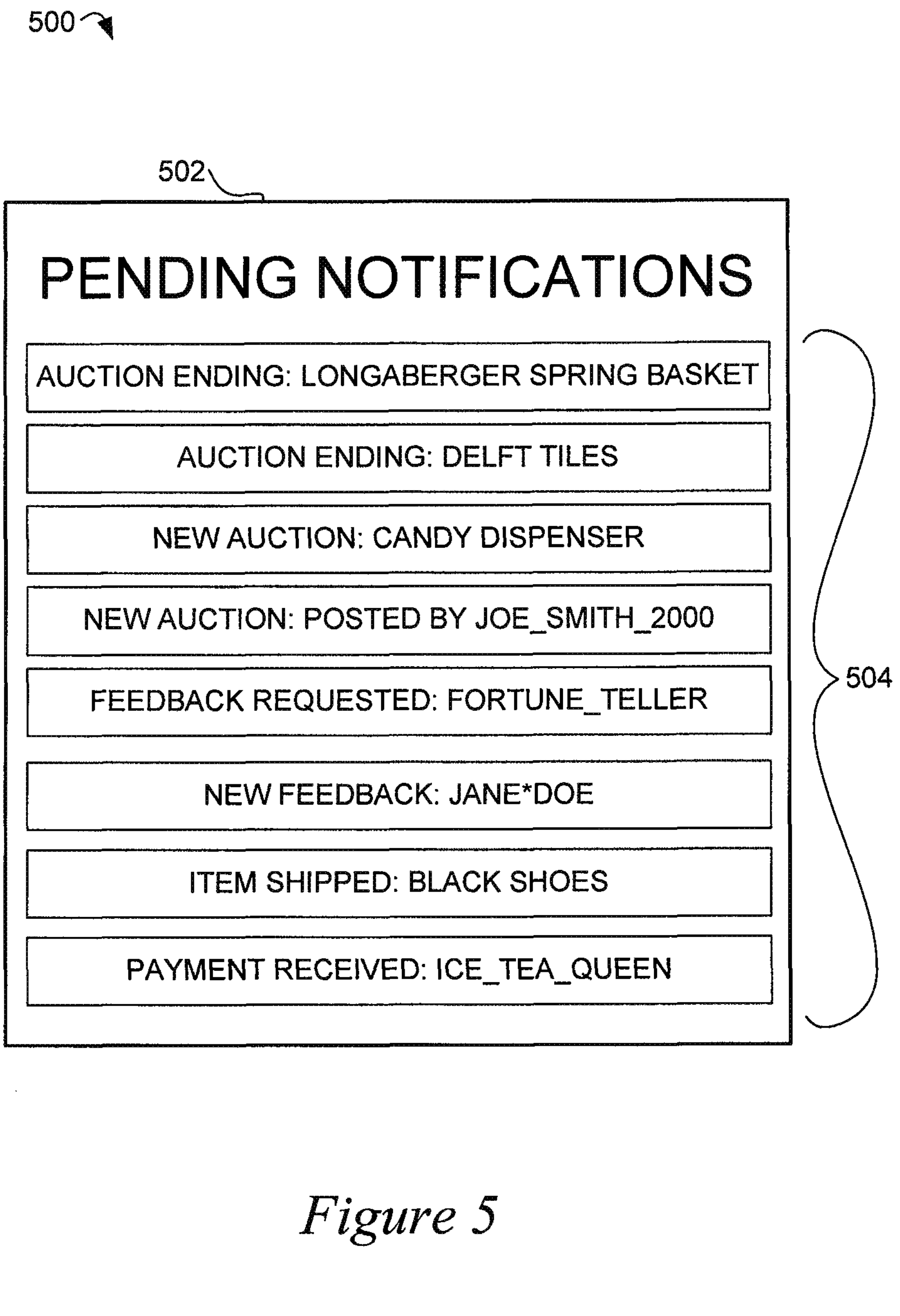
FIG. 5 is an illustration depicting at least a portion of another user interface, according to some embodiments.

In an operation 310, the notification is optionally stored in a notification mailbox at the client machine 112. An example of the notification mailbox is shown in FIG. 5, discussed below. The notification stored in the notification mailbox may be sorted according to age, type, urgency, or according to some other criteria that may or may not be user defined. For example, operation 310 may not be performed in embodiments where the client machine 112 performs operation 304.

In an operation 312, based on user input, the notification is optionally accessed via the notification mailbox and displayed to the user. For example, operation 312 may not be performed in embodiments where the client machine 112 performs operation 304.

In an operation 314, the user interacts with the notification by, for example, clicking a link in the notification to subscribe to the auction and to send a subscription message to the bidding system 200. Operation 314 may be optional in embodiments where the client machine 112 performs operation 304. In these instances, the client machine may automatically subscribe to the auction without user interaction.

In an operation 316, the bidding system 200 registers the client machine 112 and establishes a connection to the client machine 112 according to a push technology. The connection persists to provide a stateful conversation between the client machine 112 and the bidding system 200 until at least the end of the auction.

In an operation 318, the bidding system 200 filters at least events received from other clients participating in the auction. The events typically comprise bids on the auction. The bids that are filtered from being sent to the client machine include, for example, bids that do not meet a reserve price, bids that are subsequently outbid, or bids that are otherwise no longer relevant to the auction.

In an operation 320, the filtered event is pushed to the client machine 112 via the connection. The filtered event may be a current high bid in the auction.

Figure 6:
FIG. 6 is an illustration depicting at least a portion of another user interface, according to some embodiments.

In an operation 322, the pushed event is displayed to the user, by for example, showing a new high bid to the user. One such user interface is shown in FIG. 6, discussed below.

In an operation 324, the user may generate a new event, such as a higher bid to outbid the other users. The new event is sent to the bidding system 200. Operations 318, 320, 322, and 324 may be repeated until the end of the auction. When the auction ends, the connection is automatically closed by the bidding system 200.

FIG. 4 is an illustration depicting at least a portion of a first user interface 400, according to some embodiments. The first user interface 400 depicts an interface generated by the bidding system 200 in operation 306. The first user interface 400 includes a notification 402 that appears on a locked screen 404 of, for example, a mobile device or other client machine, such as a personal computer or notepad. The notification may appear in the center of the locked screen 404, in a top notification bar of the locked screen 404, or in another location of the locked screen. The notification 402 may be a splash screen as shown, a scrolling notification appearing in a dedicated portion of the user interface, or have some other format. In some instances, the notification may include a button 406 or other interface element to allow a user to immediately subscribe to the auction.

FIG. 5 is an illustration depicting at least a portion of another user interface 500, according to some embodiments. The user interface 500 includes a notification mailbox 502 containing a plurality of notifications 504. As depicted, the notifications 504 may be sorted based on type. For example, the notifications apprising the user that a selected auction is ending appears at the top, auction notifications based on saved searches appear next followed by notifications based on action items and confirmations. Other sorting patterns may be used. Further, the notifications in the notification mailbox 502 may be automatically removed upon reaching an expiration date and time. In some instances, additional buttons (not shown) may be included to allow the user to remove a notification from the notification mailbox without further interaction with the notification. By clicking or tapping on a particular notification, the user may open the notification to interact with the notification.

FIG. 6 is an illustration depicting at least a portion of another user interface 600, according to some embodiments. The user interface 600 includes a pushed event interface 602, including pushed events such as a time remaining clock 604, a current bid 606, and an updated minimum bid 608. The pushed event interface further comprises a form element 610 to allow the user to submit a new bid and a button 612 to allow the user to submit the entered bid to the bidding system 200.

Figure 7:
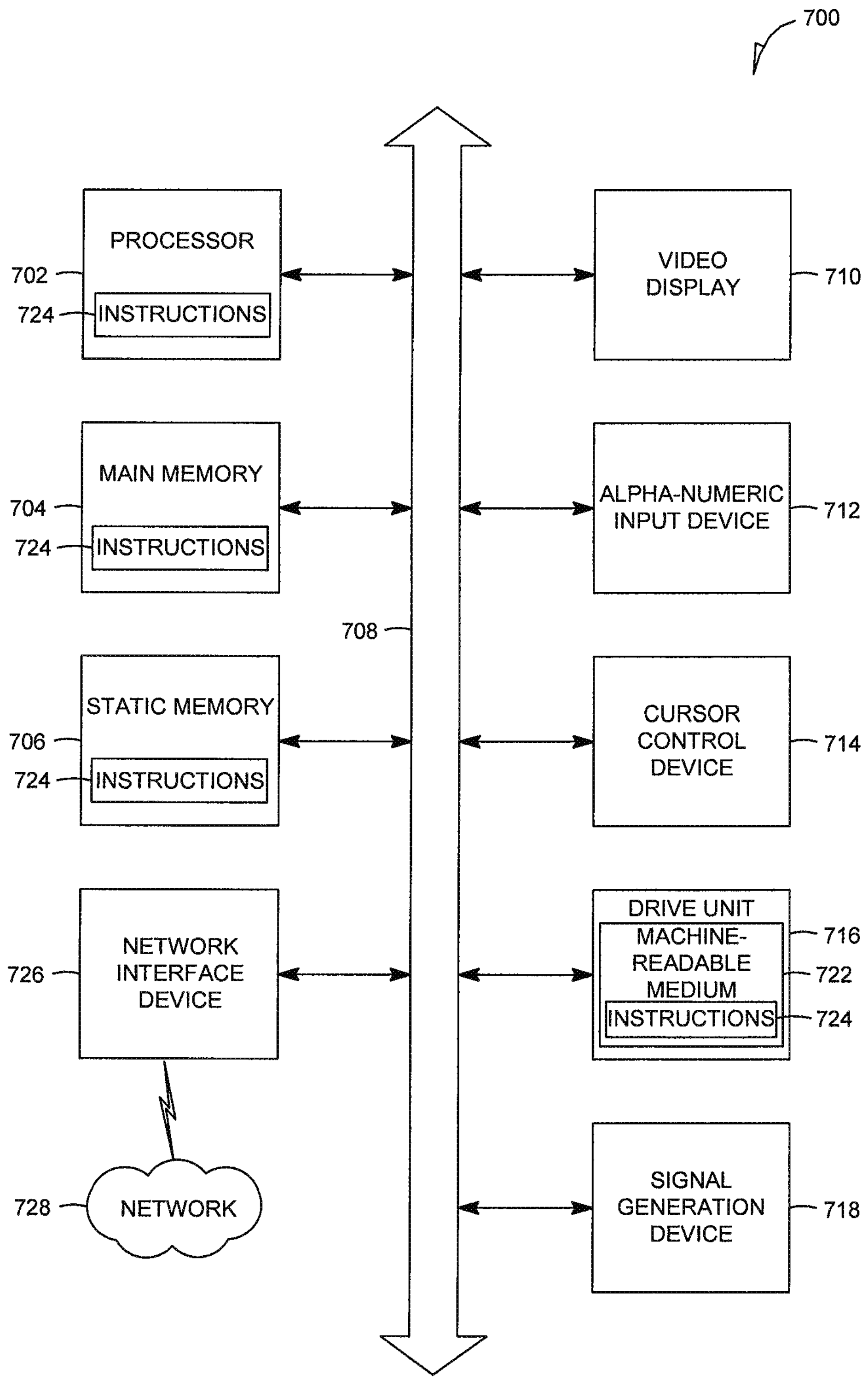
FIG. 7 is a simplified block diagram of a machine in an exemplary form of a computing system within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a handheld device such as a smartphone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720. In some embodiments, the computer system 700 may include a touch screen.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media:

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and a scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Thus, a method and system to provide substantially real-time bidding have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a notification module configured to:
receive, from a client machine of a user, a selection of an auction for bidding;
generate a first notification for the client machine when a time remaining in the selected auction is less than a predetermined amount of time, the first notification being generated before an end of the selected auction when a winner of the auction is determined, the first notification comprising a user interface element configured to enable the client machine of the user to send a subscription message associated with the auction; and
transmit the first notification to the client machine before the end of the selected auction;
a subscription module configured to establish an electronic connection with the client machine after receiving the subscription message from the client machine, the subscription message enabling receipt of a highest received bid in the selected auction, the electronic connection established using a push technology; and
an event filter configured to filter a plurality of events related to the selected auction to obtain a filtered event that includes the highest received bid in the selected auction, the filtered event being pushed for display on the client machine by the subscription module via the electronic connection before an end of the selected auction, the pushing of the filtered event causing a display on the client machine notifying the user of the highest received bid in the selected auction.

2. The system of claim 1, wherein the notification module is further to generate a second notification based on a saved search.

3. The system of claim 1, wherein the notification module is further to generate a second notification based on an action item to be completed by a user of the client machine.

4. The system of claim 1, wherein the notification module is further to generate a second notification based on a confirmation generated by an electronic marketplace of the auction.

5. The system of claim 1, wherein the filtered event further comprises the time remaining in the auction.

6. The system of claim 1, wherein the filtered event further comprises a minimum bid in the selected auction.

7. The system of claim 1, wherein the event filter is further to receive another event from another client machine, the other event comprising a subsequent highest received bid in the selected auction.

8. The system of claim 1, wherein the client machine comprises a notification mailbox to:
display the first notification to a user of the client machine;
retrieve the first notification; and
transmit the subscription message based on the first notification.

9. The system of claim 8, wherein the notification mailbox is to remove the first notification from the notification mailbox based on an expiration time associated with the first notification.

10. The system of claim 8, wherein the notification mailbox is to sort the first notification based on a type of the first notification.

11. A method comprising:

receiving, from a client machine of a user, a selection of an auction for bidding;

generating a first notification for the user when a time remaining in the selected auction is less than a predetermined amount of time, the first notification being generated before an end of the selected auction when a winner of the auction is determined, the first notification comprising a user interface element configured to enable the client machine of the user to send a subscription message associated with the auction;

transmitting the first notification to the client machine before the end of the selected auction;

receiving the subscription message from the client machine after transmitting the first notification, the subscription message enabling receipt of a highest received bid in the selected auction;

establishing an electronic connection with the client machine responsive to the received subscription message, the electronic connection established using a push technology;

filtering a plurality of events related to the selected auction to obtain a filtered event that includes the highest received bid in the selected auction; and pushing, by a server machine; the filtered event to the client machine via the electronic connection before the end of the selected auction, the pushing of the filtered event causing a display on the client machine notifying the user of the highest received bid in the selected auction.

12. The method of claim 11, further comprising:

receiving another event from other client machine, the other event comprising a subsequent highest received bid in the selected auction.

13. The method of claim 12, further comprising:

pushing the other event to the client machine to notify the user of the subsequent highest received hid.

14. The method of claim 11, further comprising:

generating a second notification based on a saved search.

15. The method of claim 11, further comprising:

generating a second notification based on an action item to be completed by a user of the client machine.

16. The method of claim 11, further comprising:

generating a second notification based on a confirmation generated by a marketplace of the auction.

17. The method of claim 11, wherein the filtered event further comprises the time remaining in the selected auction.

18. The method of claim 11, wherein the filtered event further comprises a minimum bid in the selected auction.

19. The method of claim 11, further comprising:

defining an expiration associated with the first notification.

20. A non-transitory machine-readable storage medium having instructions executable by a processor, that when executed by the processor cause the processor to perform a method for bidding, the method comprising:

receiving, from a client machine of a user, a selection of an auction for bidding;

generating a notification for the user when a time remaining in the selected auction is less than a predetermined amount of time, the notification being generated before an end of the selected auction when a winner of the auction is determined, the notification comprising a user interface element configured to enable the client machine of the user to send a subscription message associated with the auction;

transmitting the notification to the client machine before the end of the selected auction;

receiving the subscription message from the client machine after transmitting the notification, the subscription message enabling receipt of a highest received bid in the selected auction;

establishing an electronic connection with the client machine responsive to the received subscription message, the electronic connection established using a push technology;

filtering a plurality of events related to the selected auction to obtain a filtered event that includes the highest received bid in the selected auction; and pushing, by a server machine, the filtered event to the client machine via the electronic connection before the end of the selected auction, the pushing of the filtered event causing a display on the client machine notifying the user of the highest received bid in the selected auction.

* * * * *